United States Patent [19]

Opitz et al.

[11] 4,078,885

[45] Mar. 14, 1978

[54] STABLE LIQUID WATER-CONTAINING DYEING COMPOSITIONS CONTAINING DISPERSE AND REACTIVE DYESTUFFS AND THEIR USE FOR DYEING OR PRINTING MIXED FIBRE MATERIALS

[75] Inventors: Konrad Opitz, Liederbach, Taunus; Heinrich Helling, Frankfurt am Main, both of Germany

[73] Assignee: Hoechst Aktiengesellschaft, Frankfurt am Main, Germany

[21] Appl. No.: 698,679

[22] Filed: Jun. 22, 1976

[30] Foreign Application Priority Data

Jun. 24, 1975 Germany .............................. 2528063

[51] Int. Cl.² ............................ D06P 1/00; D06P 1/38
[52] U.S. Cl. .......................................... 8/1 A; 8/1 C; 8/1 P; 8/1 Q; 8/21 B; 8/21 C; 8/25; 8/26; 8/39 R; 8/41 R; 8/76; 8/79; 8/82
[58] Field of Search ..................... 8/21 B, 21 C, 81 E, 8/11 P, 1 Q, 1 A, 1 C, 25, 26, 76, 79, 82, 1 P

[56] References Cited

U.S. PATENT DOCUMENTS 3,990,846  11/1976  Lehinant et al. ...................... 8/163

FOREIGN PATENT DOCUMENTS 1,619,471  12/1975  Germany.

OTHER PUBLICATIONS

K. Venkataraman, "The Chemistry of Synthetic Dyes," vol. VI, Reactive Dyes (Academic Press, 1972), pp. 327–449.

Fortess et al., American Dyestuff Reporter, May 27, 1963, pp. 16-25.
King, American Dyestuff Reporter, Feb. 17, 1964, pp. 38-40.
Wygand, American Dyestuff Reporter, Dec. 7, 1964, pp. 106-109.
Davis, J. Soc. Dyers and Colourists, Mar. 1973, pp. 77-80.

*Primary Examiner*—A. Lionel Clingman
*Attorney, Agent, or Firm*—Curtis, Morris & Safford

[57] ABSTRACT

A stable, liquid, aqueous dyeing composition consisting of (a) 3 to 25 percent by weight of at least one fibre-reactive dyestuff of the formula

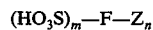

$$(HO_3S)_m\text{---}F\text{---}Z_n$$

in which F represents the radical of a dyestuff chromophore of an anthraquinone-, monoazo-, disazo-, trisazo- or phthalocyanine dyestuff, Z represents a fibre-reactive group, $m$ stands for an integer from 1 to 6 and $n$ stands for an integer from 1 to 3, (b) 3 to 25 percent by weight of at least one disperse dyestuff, (c) 0.5 to 5 percent by weight of a buffer substance, (d) 3 to 40 percent by weight of a dispersing agent, wetting agent, antifreezing agent or preservative or mixtures thereof, and (e) water, and having a pH value between 4 and 7, said dyeing compositions being suitable for the dyeing or printing of blends of fibres containing on the one hand wool, silk, fibres of native or regenerated cellulose, and on the other hand synthetic polyamide, polyacrylonitrile or linear polyesterfibres.

2 Claims, No Drawings

STABLE LIQUID WATER-CONTAINING DYEING COMPOSITIONS CONTAINING DISPERSE AND REACTIVE DYESTUFFS AND THEIR USE FOR DYEING OR PRINTING MIXED FIBRE MATERIALS

The present invention relates to stable liquid water-containing dyeing compositions containing at least in each case one reactive dyestuff and disperse dyestuff, characterized by a content of 3 to 25% by weight, preferably 5 to 15% by weight, of at least one reactive dyestuff of the general formula (1)

in which F represents the radical of a dyestuff chromophore of an anthraquinone-, monoazo-, disazo-, trisazo- or phthalocyanine dyestuff, Z represents a fibre-reactive group $m$ stands for an integer of from 1 to about 6 and $n$ stands for an integer of from 1 to 3, furthermore characterized by 3 to 25% by weight, preferably 5 to 15% by weight of at least one disperse dyestuff, 0.5 to 5% by weight of a buffer substance and 3 to 40% by weight of dispersing agents and auxiliaries, as well as water (completed to 100% by weight) and, moreover, by a pH value of from 4 to 7, preferably from 5.0 to 6.5; the invention further relates to the use of these compositions for the dyeing or printing of mixed fibre materials, containing on one hand wool, silk, natural or regenerated cellulose fibres and on the other hand synthetic polyamide, polyacrylonitrile or polyester fibres. The content of water of the dyeing compositions is generally 40 to 80% by weight.

The phthalocyanine and azo dyestuffs of the mentioned formula (1) may also be available as copper, chrome, cobalt, nickel or iron complex compounds.

The disperse dyestuffs may belong to the group of the monoazo-, disazo-, anthraquinone-, nitro-, diphenylamino-, styryl-, azostyryl-, quinophthalone-, methine-, naphthoperinone or naphthoquinone-imine dyestuffs and are free from hydrosolubilizing groups.

The dyeing compositions of the invention contain the reactive dyestuffs preferably in the form of the sodium salts in dissolved form and the disperse dyestuffs preferably in a high fine division.

Reactive dyestuffs of the formula mentioned (1) which are excellently suitable for the liquid dyeing preparations of the invention are for example known from German Offenlegungsschriften Nos. 1,544,538; 1,544,541; 1,619,491; 1,769,091; 1,804,524; 2,049,644; from German Auslegeschriften Nos. 1,219,155; 1,230,152; 1,262,475; 1,289,929; 1,544,500 and from German patent specifications Nos. 960,534; 1,126,542; 1.150,163; 1,192,761; 1,206,107; 1,229,213; 1,236,107; 1,246,906; 1,248,188; 1,268,759; 1,278,041; 1,282,213; 1,283,206; 1,289,207; 1,289,211 and 1,289,930.

Fibre-reactive groups Z are those which, when applying the dyestuffs onto natural or regenerated cellulose fibre materials or mixed fabrics containing such fibres, are capable of reacting, in the presence of acid-binding agents and, if desired, under the action of heat, with the hydroxy groups of the cellulose or when applying the dyestuffs onto synthetic or natural superpolyamide fibres, such as wool, with the NH groups of these fibres, while forming covalent bonds. A great number of such fibre-reactive groups are known from the literature (thus, for example, 5- and 6-membered heterocyclic rings with at least one substituent capable of being split off). Among these dyestuffs of the formula (1) there are suitable for the stable liquid dyeing compositions of the invention those dyestuffs, wherein Z is a β-sulfatoethylsulfonyl group, a β-thiosulfatoethylsulfonyl, a β-chloroethylsulfonyl group, a vinylsulfonyl, a vinylsulfonyl methylamino or a β-sulfatoethylsulfonylmethylamino group.

Buffer substances suitable for the dyeing compositions of the invention are those which are not capable of a chemical reaction with the reactive group Z reducing the color intensity, such as sodium and potassium acetate, sodium and potassium oxalate, the primary, secondary and tertiary sodium and potassium salts of the phosphoric acid or the mixtures thereof as well as sodium borate. There may be preferably mentioned primary and secondary sodium phosphate, mixtures of these two substances and sodium borate.

The auxiliaries contained in the dyeing compositions beside the dispersing agents are for example wetting agents, antifreezing agents or preservatives.

Suitable dispersing agents are, for example, the alkali metal or ammonium salts of ligninsulfonic acids, preferably the sodium salts, furthermore condensation products of naphthalenesulfonic acids with formaldehyde, condensation products of phenols or cresols with formaldehyde and sodium bisulfite, condensation products of a mixture of kresol and Schaffer salt with formaldehyde and sodium bisulfite, and the sulfuric acid or succinic acid semi-ester of novolacs on the basis of oxethylated alkyl phenols.

Suitable wetting agents are for example: Alkylarylsulfonic acids or the alkali salts thereof, for example the sodium salt of diisobutylnaphthalene-sulfonic acid, alkylsulfonates, such as $C_{12}$–$C_{14}$-alkyl-sulfonates, or olefin sulfonates.

As antifreezing agents there may be used for example glycol ethers or glycol esters.

Halogenated phenols, quarternary ammonium salts or compounds yielding formaldehyde may serve as preservatives.

Generally, the usual dispersing, wetting, antifreezing agents and preservatives may be used, inasfar as they do not react with the reactive groups of the reactive dyestuffs.

Disperse dyestuffs suitable for such stable liquid dyeing compositions are, for example, known from German Offenlegungsschriften Nos. 1,813,385; 2,249,739; 1,469,620; the German Auslegeschriften Nos. 1,129,249; 1,180,472; 1,069,313; 1,276,255; the German Patent Specifications Nos. 263,423; 439,111; 1,154,433, 1,213,551; 1,670,880; the Swiss Patent Specifications Nos. 441,555; 454,314; 455,087; 458,579; 468,443; the Austrian Patent Specification No. 240,825 and French Patent Specifications Nos. 1,497,263 and 1,524,647:

The dispersing agents normally used for the preparation of disperse dyestuff compositions are generally anion-active compounds, such as for example the alkali metal salts of ligninsulfonic acids, of naphthalene-sulfonic acid-formaldehyde condensation products or of kresol-formaldehyde-sodium sulfite condensation products. Furthermore, such commercial disperse dyestuff compositions may contain diluents, auxiliaries, preservatives and antifreezing agents in the case of liquid compositions.

After their synthesis water-soluble reactive dyestuffs are isolated in usual manner; they are salted out from the aqueous reaction solution, the precipitated mixture of salt and dyestuff is suction-filtered and the press cake obtained is dried. Another technically usual method of isolating the dissolved dyestuff, which is generally well soluble in water, from the synthesis solutions, is the direct drying, for example the spray drying of the preparation solution.

For the dyeing desired the salt-containing dyestuff powder is generally adjusted after drying to a certain dyestuff content by admixture of neutral inorganic salts, such as for example sodium sulfate.

After their synthesis the water-insoluble disperse dyestuffs are isolated in usual manner: they are suction-filtered from the aqueous, water-containing or anhydrous reaction mixture and freed by washing with an organic solvent and/or water, from electrolytes and other undesired admixtures. For the application in dyeing the still moist or dried press cake has to be converted by known processes into a high fine division, as for example a wet grinding in a sand or perl mill in the presence of dispersing agents. The resulting grinding paste, if desired, after addition of further dispersing agents or diluents and auxiliaries, may be processed either to a liquid compositions or after drying, for example spray drying or fluidized bed drying, to a pulverous disperse dyestuff composition having a standardized dyestuff content.

To prepare the dyestuff compositions of the invention liquid disperse dyestuff compositions are mixed either with stable liquid reactive dyestuff compositions containing buffer substances in the ratio desired, optionally with addition of water, or mixed with reactive dyestuff powders poor in electrolytes, if possible, buffer substances and, if desired, water.

A further possibility to prepare the dyeing compositions of the invention is that the fine division of the disperse dyestuffs is already carried out in the presence of the necessary amounts of buffer substances and reactive dyestuffs.

With the increasing importance of mixed fabrics of natural and synthetic fibres, dyestuff producers have developed mixed materials containing natural and synthetic fibres which permit a one-bath dyeing and one-step printing of such fixed fabrics. For mixed fabrics of cotton and polyester ther are on the basis of disperse and vat dyestuffs mixed materials which are now available in the form of liquid dyeing compositions. In contradistinction thereto, the mixed materials containing disperse and reactive dyestuffs exist only as powder brands. However, pulverulent dyestuffs, and thus, also powders containing such disperse and reactive dyestuffs have several drawbacks, which are due, in particular, to dust formation by these pulverulent dyeing compositions, when they are being handled, for example during emptying or refilling of containers, weighing and measuring, or in the preparation of dye baths or printing pastes. This dust formation is not only annoying for the workers in the manufacturing plate or the application unit, but in the dyeing or printing process it may also lead to unpleasant colour specks on the undyed or dyed material, due to the settling of the dyestuff dust. However, dust removal of pulverulent dyestuffs by means of the common dust removing agents based on mineral oils always involves the risk of oily deposits in the dyeing and printing operations, which leads to stained and thus, useless dyeings and prints. Moreover, these pulverulent dyestuffs often prevent the application of rationalization measures which are technically desirable, for example continuous dyeing processes or automatic measuring and weighing devices.

The liquid dyestuff preparations of the invention completely avoid these drawbacks which apply also to the pulverulent disperse and reactive dyestuffs; moreover, these novel preparations have the advantage both for the dyestuff producers and those who use them that the salt charge of the waste water is considerably reduced; because the dyeing preparations of the invention are prepared with reactive components of low electrolyte content. This is achieved in the following way: the reactive dyestuffs are not isolated by salting out, but either the clarified dyestuff solution obtained in the synthesis of reactive dyestuffs is directly used and, if desired, advantageously adjusted to the higher dyestuff content desired, either by concentration, for example by distilling part of the water under reduced pressure, or preferably by adding a dried, for example spray-dried portion of the same clarified dyestuff solution obtained in the synthesis; or only the powder obtained by drying for example spray-drying, the clarified dyestuff solution is used without the addition of inorganic salts, for example sodium sulfate, otherwise usual for the standardization of the color intensity. In order to keep the content of inert salt as low as possible also in the case of solutions of the reactive dyestuffs with the β-sulfatoethylsulfonyl group, which were obtained by esterification of the β-hydroxyethylsulfonyl group with concentrated sulfuric acid, the excess of sulfuric acid necessary for the formation of this sulfuric acid semiester group cannot be neutralized with the sodium hydroxide solution or other reagents which lead to easily soluble inert salts. It is recommendable in this case to neutralize the excess of sulfuric acid with calcium carbonate and to separate the dyestuff solution by filtration from difficultly soluble calcium sulfate. This method is described, for example, in German Offenlegungsschriften Nos. 1,955,849, Example 1; 2,049,664, Example 1; and 2,060,081, Example 2.

Thus the dyestuff producer can do without the very saliferous mother liquors which are partly saturated with salt and also for those who use the dyestuff the salt content of the waste water is considerably reduced, because the amounts of salt used for adjusting reactive dyestuff powders are no longer required in the preparation of the liquid formulations of the invention.

Many of the stable liquid dyeing preparations of the invention have the further advantage with regard to corresponding pulverulent dyestuff mixtures, that with dyeings according to the thermosol process there are obtained much higher color yields than when using the powder brands, calculated on identical contents of pure dyestuff.

The mechanism of the reaction of reactive dyestuff with cellulose fibers is generally known. For example in the case of reactive dyestuffs of the vinylsulfone type, the formation of a covalent bond between the fibre substrate and the dyestuff molecule according to the reaction (4) of scheme 1 shown below, after conversion of the β-sulfatoethylsulfonyl group into the vinyl sulfone group in the presence of alkaline agents (reaction (1)), leads to the known good fastness properties of dyeings produced with these reactive dyestuffs.

The same is true for the reactive dyestuffs containing halogeno-triazinyl radicals, in which a covalent bond with the fibre is formed in accordance with reaction (6) of scheme 2.

However, it is known that the reactive dyestuffs containing the β-sulfatoethyl-sulfonyl group, or the corresponding vinylsulfonyl group react with water - not only in the presence of alkaline agents but also in the acid range and that the reaction is concurrent with the dyeing reaction (4) itself, proceeds according to reactions (2) or (3) of scheme 1, and results in formation of the β-hydroxyethylsulfonyl group, which is slow to react with the fibre substrate.

Scheme 1:

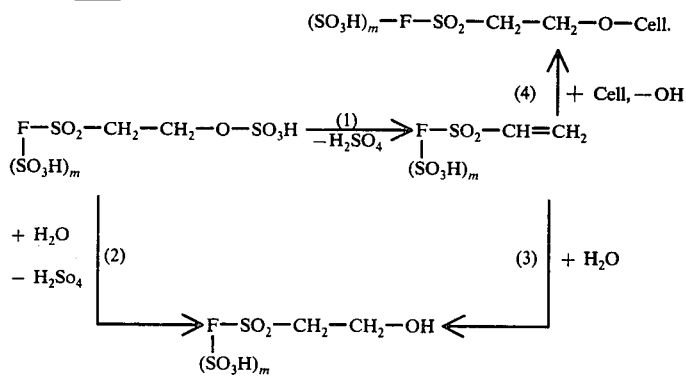

Scheme 2:

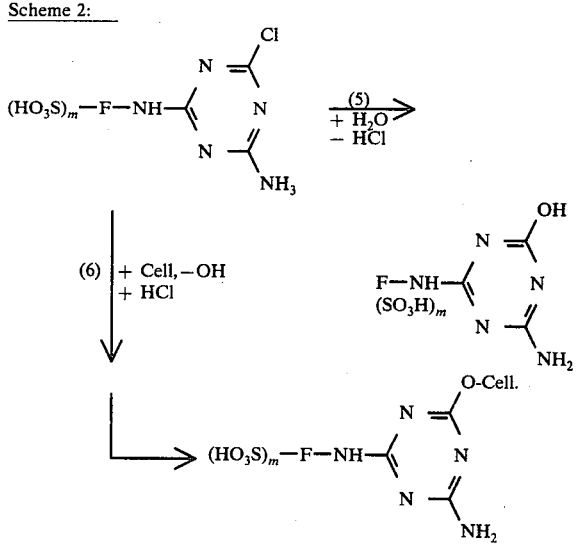

wherein F represents the radical of the dyestuff molecule and m has the above meaning and cell. —OH stands for the cellulose.

The hydrolysis (2) and the addition of water (3) are practically irreversible under dyeing conditions and thus, reduce the dyestuff yield.

In the case of the 2-amino-4-chlorotriazinyl group for example, the hydrolysis (5) leads to a 2-amino-4-hydroxytriazinyl group. In this case, too, the hydrolysis (5) is practically irreversible under dyeing conditions, which leads to a reduced dyestuff yield, as the 2-amino-4-hydroxytriazinyl group is unable to react while forming a covalent bond with the fibre.

It is also known that the fine division of disperse dyestuffs is adversely affected by the addition of electrolytes in liquid formulations and dyeing liquors. This appears either in an altered stability to storage of such liquid disperse dyestuff preparations containing electrolytes or in a deteriorated stability in the dyeing which leads to a reduced tinctorial strength, uneven dyeing or a worse fastness to rubbing.

Thus, it has been even more surprising to find that neutral to slightly acid aqueous buffered liquid compositions containing liquid disperse and reactive dyestuffs (I) can be used and stored without a reduction in their tinctorial strength and fine division property, though the reactive dyestuffs used are electrolytes themselves and optionally have an inevitable content of inert salts due to the synthesis.

Even after a storage of several months, for example 4 months at room temperature, or after a storage of several weeks, for example eight weeks at 50° C, the liquid dyeing preparations of the invention do not show any deterioration of the fine division and provide dyeings and prints having an unchanged tinctorial strength.

The dyeing preparations of the invention are very suitable for the one-bath dyeing and one-step printing of mixed material containing as one component wool, silk or preferably natural or regenerated cellulose fibres and as a second component a synthetic polyamide, polyacrylonitrile or preferably polyester fibre, such as a polyethylene terephthalate fibre.

The following Examples illustrate the invention. Parts and percentages are by weight unless stated otherwise.

EXAMPLE 1

280 parts of an aqueous liquid composition prepared in usual manner, of the disperse dyestuff known from German Auslegeschrift No. 1,069,313, Table 2, Example 49, of the formula (2)

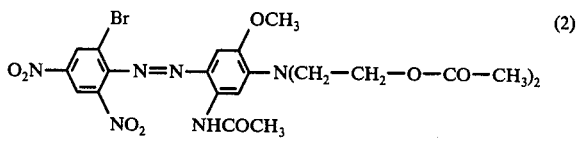

having a dyestuff content of 15% and a content of 15% of a sodium lignin sulfonate are mixed with 120 parts of an aqueous liquid formulation prepared in usual manner, of the disperse dyestuff of the formula (3) known from Austrian Patent Specification No. 240,825

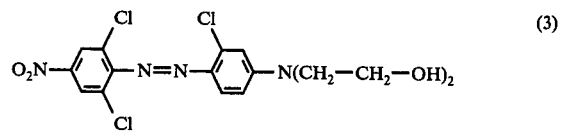

having a dyestuff content of 21% and a content of 14.7% of a condensation product of kresol/formaldehyde/sodium sulfite of 19.5 parts of an aqueous liquid formulation prepared in usual manner, of the disperse dyestuff known from German Patent Specification No. 1,154,433, Examples 1 and 2, of the formula (4)

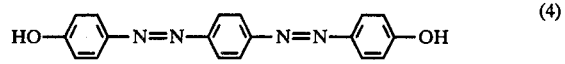

(4)

having a dyestuff content of 10% and a content of 8% of a sodium lignin sulfonate. Then, 19.5 parts of an aqueous liquid dyeing preparation of the reactive dyestuff of the formula (5)

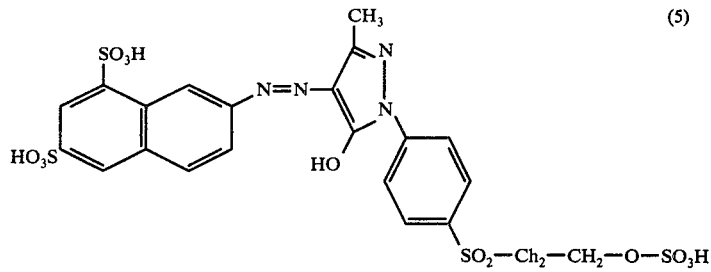

(5)

containing 25% of dyestuff and 1.6% of disodium hydrogen phosphate, 50 parts of an aqueous liquid dyeing preparation of the reactive dyestuff of the formula (6)

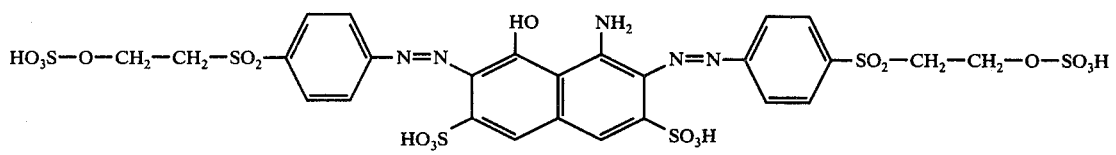

(6)

containing 22.5% of dyestuff and 2.5% of disodium hydrogen phosphate and 160 parts of a liquid aqueous dyeing preparation of the reactive dyestuff of the formula (7)

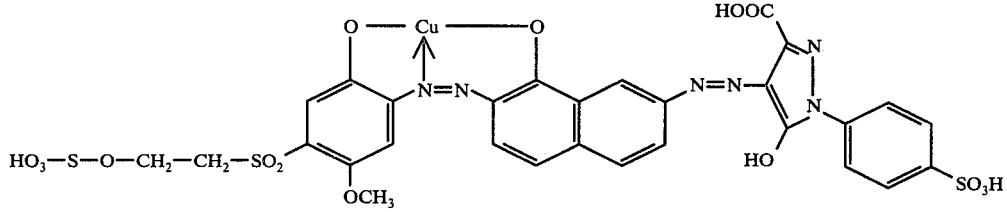

containing 25% of dyestuff and 2.6% of disodium hydrogen phosphate are added while stirring. 649 parts of a stable liquid dyeing preparation containing on the whole 18.9% of pure dyestuffs of the formulae (2), (3), (4), (5), (6) and (7) and having a pH value of 5.8 are obtained.

With 2 parts of this pH stabilized dyeing preparation, dyebaths, padding liquors and printing pastes were prepared in each case in known and usual manner, which were applied and fixed in a manner usual for the one-bath dyeing or one-step printing of mixed fabrics of cotton and polyester with reactive and disperse dyestuffs, and yielded grey to black dyeings and prints, on which in the case of thermosol dyeings had a 15% higher strength, in the case of the other dyeing and printing processes the same tinctorial strength as those prepared while using accordingly dyebaths, padding liquors or printing pastes with 1 part of a powder formulation having a double content of pure dyestuff.

This tinctorial strength of the prints and dyeings was maintained unaltered when the stable liquid dyeing preparation described above was stored for 4 months at 20° C in a closed vessel.

EXAMPLE 2

286 Parts of the liquid formulation used in Example 1 of the disperse dyestuff of the formula (2) are mixed with 65 parts of the liquid composition also used in Example 1 of the disperse dyestuff of the formula (4) and 29 parts of an aqueous liquid formulation prepared in usual manner, of the disperse dyestuffs known from Austrian patent specification No. 264,688, Example 1, and corresponding to the formula (8)

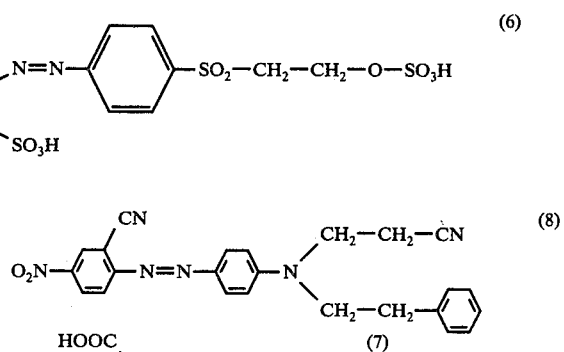

(8)

(7)

having a dyestuff content of 20% and a content of 10% of a condensation product of kresol / formaldehyde / Schaffer salt and sodium sulfite and 10% of a sodium lignin sulfonate. (The Schaffer salt is the sodium salt of the 2-naphthol-6-sulfonic acid). While stirring, 120 parts of the aqueous preparation of the reactive dyestuff of the formula (6) also used in Example 1 were added. 500 Parts of a stable liquid dyeing preparation containing on the whole 16.44% of pure dyestuffs of the formulae (2), (4), (6) and (8) were obtained which had a pH value of 6.0.

Using 2 parts of this pH stabilized dyeing preparation, dyebaths, padding liquors and printing pastes were prepared each time in known and usual manner which — when applied and fixed according to methods usual for the one-bath dyeing or one-step printing of mixed fabrics of cotton and polyester with reactive and disperse dyestuffs — yielded navy blue dyeings and prints which in the case of thermosol dyeings had a 15% stronger, in the case of the other dyeing and printing processes the same tinctorial strength as those which had been prepared while using accordingly dyebaths, padding liquors or printing pastes of the same concentration, with one part of a powder formulation containing the double content of pure dyestuff.

This tinctorial strength of the dyeings and prints was maintained unaltered when the stable liquid dyeing preparation was stored for 8 weeks at 50° C in a closed vessel.

EXAMPLE 3

130 Parts of an aqueous liquid formulation prepared in usual manner of the disperse dyestuff known from German Patent Specification No. 439,311, Example 1, having the formula (9)

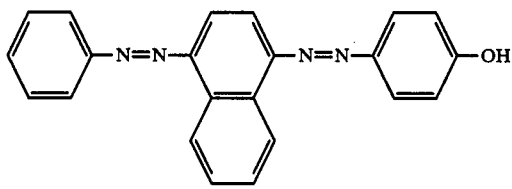

(9)

having a dyestuff content of 18% and a content of 9% of a condensation product of kresol/formaldehyde/-Schaffer salt/sodium sulfite are diluted with 200 parts of water and mixed, while stirring, with 15 parts of sodium dihydrogen phosphate. Then, stirring was continued and 31.2 parts of a dyestuff powder was introduced which contained 90.7% of the reactive dyestuff known from German Patent Specification No. 1,150,163, Example 1, and having the formula (10)

legungsschrift No. 1,619,672, Example 1, lower formula on page 8, and having the formula (11)

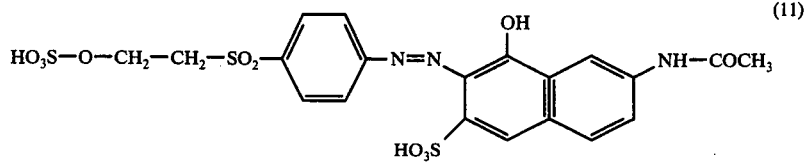

(11)

After addition of further 16.3 parts of water 440 parts of a stable liquid dyeing preparation containing on the whole 13.4% of pure dyestuffs of the formulae (9), (10) and (11) were obtained which had a pH value of 5.6.

Using 2 parts of the pH stabilized dyeing preparation dyebaths, padding liquors and printing pastes were prepared in known and usual manner which — when applied and fixed according to methods usual for the one-bath dyeing or one-step printing of mixed fabrics of cotton and polyester with reactive and disperse dyestuffs — yielded orange dyeings and prints which had the same tinctorial strength as those prepared while using accordingly dyebaths, padding liquors or printing pastes of the same concentration with one part of a powder formulation having the double content of pure dyestuff.

This tinctorial strength of the prints and dyeings was maintained unaltered when the stable liquid dyeing preparation described above was stored at 50° C for 8 weeks in a closed vessel.

EXAMPLE 4

57.2 parts of the liquid composition used in Example 2 of the disperse dyestuff of the formula (8) are mixed with 13.4 parts of an aqueous liquid composition prepared in usual manner, of the disperse dyestuff of the formula (12) known from French patent specification No. 1,497,263, Example 5

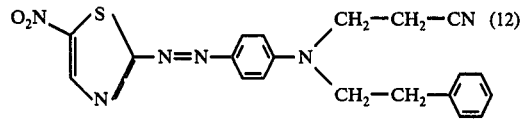

(12)

having a dyestuff content of 28% and a content of 17.5% of a sodium lignin sulfonate. After diluting with 50 parts of water 2.5 parts of sodium dihydrogen phosphate, 1.25 parts of disodium-hydrogen phosphate and 33.6 parts of a dyestuff powder were obtained which contained 56.5% of the reactive dyestuff known from

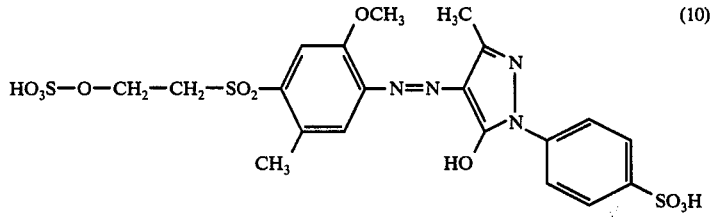

(10)

and 7.5 parts of a dyestuff powder containing 61.3% of the reactive dyestuff known from German Offen- German Auslegeschrift No. 1,280,809, columns 13 and 14, Example 7, of the Table, and having the formula (13)

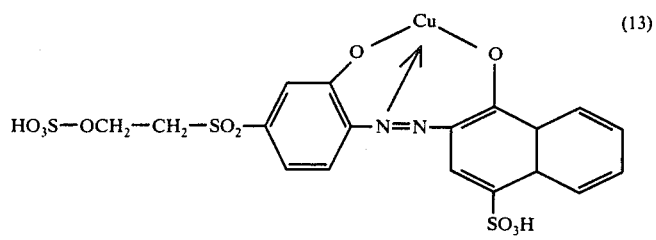
(13)

After addition of further 42 parts of water 200 parts of a stable liquid dyeing preparation was obtained containing on the whole 17.1% of pure dyestuff of the formulae (8), (12) and (13) and having a pH value of 5.8.

Using 2 parts of this pH stabilized dyeing preparation, dyebaths, padding liquors and printing pastes were prepared in known and usual manner which — when applied and fixed according to methods common for the one-bath dyeing or one-step printing of mixed fabrics of cotton and polyester with reactive and disperse dyestuffs — yielded bluish-red dyeings and prints which had the same tinctorial strength as those prepared while using accordingly dyebaths, padding liquors or printing pastes of the same concentration, with one part of a powder formulation having the double content of pure dyestuff.

This tinctorial strength of the dyeings and prints was maintained unaltered when the stable liquid dyeing preparation described above was stored for 4 months at 20° C in a closed vessel.

EXAMPLE 5

255 Parts of an aqueous liquid composition prepared in usual manner of the disperse dyestuff known from German Patent Specification No. 1,813,385, Example 1, having the formula (14)

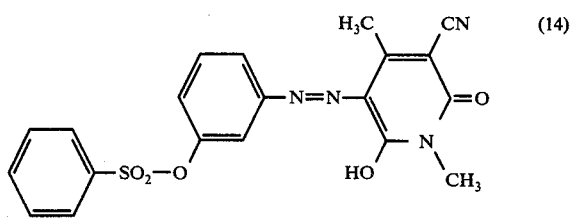
(14)

having a dyestuff content of 20% and a content of 25% of a sodium lignin sulfonate are mixed with 39 parts of the liquid composition already used in Example 1 of the disperse dyestuff of the formula (4) and diluted with 400 parts of water. While stirring, 32 parts of sodium dihydrogen phosphate, 16 parts of disodium hydrogen phosphate, 122 parts of a dyestuff powder containing 81.9% of the reactive dyestuff known from German patent specification No. 1,644,157, Example 3, having the formula (15)

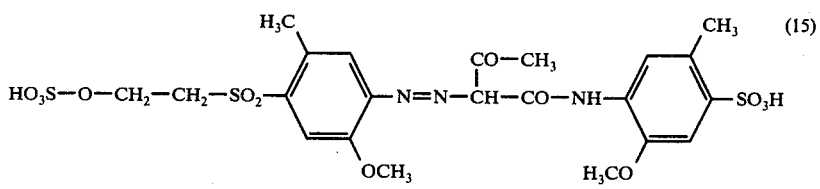
(15)

and 68.5 parts of a dyestuff powder containing 65.7% of the reactive dyestuff known from German patent specification No. 1,248,188, Example 1, and having the formula (16)

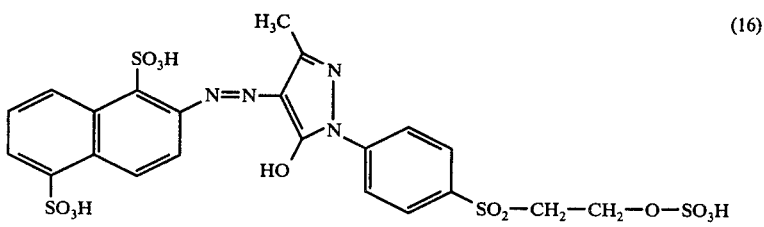
(16)

were added.

After addition of further 67.5 parts of water 1000 parts of a stable liquid dyeing preparation containing on the whole 20% of pure dyestuffs of the formulae (4), (14), (15) and (16) and having a pH value of 6.0 were obtained.

Using 2 parts of this pH stabilized dyeing preparation, dyebaths, padding liquors and printing pastes were prepared in known and usual manner, which — when applied and fixed according to methods common for the one-bath dyeing or one-step printing of mixed fabrics of cotton and polyester with reactive and disperse dyestuffs — yielded clear yellow dyeings and prints which had the same tinctorial strength as those prepared while using dyebaths, padding liquors or printing pastes of the same concentration, with one part of a powder formulation having the double content of pure dyestuff.

This tinctorial strength of the dyeings and prints was maintained unaltered when the stable liquid dyeing preparation described above was stored for 4 months at 20° C in a closed vessel.

We claim:

1. A stable, liquid, aqueous dyeing composition consisting of (a) 3 to 25 percent by weight of at least one fibre-reactive dyestuff of the formula $(HO_3S)_m—F—Z_n$ in which F represents the radical of a dyestuff chromophore of an anthraquinone-, monoazo-, disazo-, trisazo or phthalocyanine dyestuff, Z represents a fibre-reactive group, m stands for an integer from 1 to 6 and n stands for an integer from 1 to 3, (b) 3 to 25 percent by weight of at least one disperse dyestuff, (c) 0.5 to 5 percent by weight of a buffer substance, (d) 3 to 40 percent by weight of a dispersing agent, wetting agent, antifreezing agent or preservative or mixtures thereof, and (e) water, and having a pH value between 4 and 7.

2. A dyeing composition as claimed in claim 1, the fibre-reactive dyestuff being contained therein having a fibre-reactive group at least one $\beta$-sulfatoethylsulfonyl-, $\beta$-phosphatoethylsulfonyl-, $\beta$-thiosulfatoethylsulfonyl-, $\beta$-chloroethylsulfonyl-, vinylsulfonyl-, vinylsulfonylmethylamino- or $\beta$-sulfatoethylsulfonylmethylamino group.

* * * * *